(12) United States Patent
Kuwabara

(10) Patent No.: US 6,846,154 B2
(45) Date of Patent: Jan. 25, 2005

(54) PUMP TURBINE

(75) Inventor: Takao Kuwabara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 10/097,403

(22) Filed: Mar. 15, 2002

(65) Prior Publication Data

US 2002/0146314 A1 Oct. 10, 2002

(30) Foreign Application Priority Data

Apr. 5, 2001 (JP) ............................... 2001-106613

(51) Int. Cl.$^7$ ................................................ F03B 3/10
(52) U.S. Cl. ........................................ 415/1; 415/910
(58) Field of Search ............................. 415/1, 17, 24, 415/30, 36, 151, 910

(56) References Cited

U.S. PATENT DOCUMENTS 3,236,498 A  * 2/1966  Kerensky .................... 415/910
3,309,057 A  * 3/1967  Tonooka ........................ 415/1
4,201,925 A  * 5/1980  Kuwabara et al. ............. 415/1

* cited by examiner

Primary Examiner—Edward K. Look
Assistant Examiner—Richard A. Edgar
(74) Attorney, Agent, or Firm—Mattingly, Stranger & Malur, P.C.

(57) ABSTRACT

In a pump turbine which can be operated in a pumping mode or a generating mode by switching the rotating direction of a runner, the discharge passing through the runner is adjusted based on a wicket gate opening; the speed of the runner is sensed; a target speed is temporarily set to a first speed different from a rated speed on generation starting; a response speed of a speed control via discharge adjusting means is controlled to a lower level after the speed reaches the target speed than that before the speed reaches the target speed; and finally, the target speed is slowly led to the rated speed, thus enhancing the stability of the speed when the turbine is started and enlarging a head range in which synchronization is achieved.

24 Claims, 15 Drawing Sheets

FIG.2

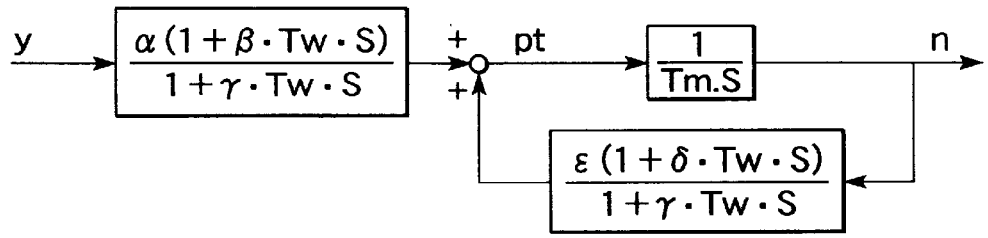

$$\alpha = \left(\frac{\partial Q}{\partial Y}\frac{\eta_0}{Q_r} + \frac{\partial \psi}{\partial Y}\frac{q_0}{\psi_r}\right) h_0 \cdot Y_r$$

$$\beta = \frac{\left[-\eta_0 \cdot \psi_r \frac{\partial Q}{\partial Y} + h_0 \cdot H_r \left(\frac{\partial \psi}{\partial Y}\frac{\partial Q}{\partial H} - \frac{\partial Q}{\partial Y}\frac{\partial \psi}{\partial H}\right)\right] q_0}{\left(\frac{\partial Q}{\partial Y}\eta_0 \cdot \psi_r + \frac{\partial \psi}{\partial Y} Q_r \cdot q_0\right) h_0}$$

$$\gamma = \frac{\partial Q}{\partial H}\frac{H_r}{Q_r}$$

$$\varepsilon = \left(\frac{\partial Q}{\partial N}\frac{\eta_0}{Q_r} + \frac{\partial \psi}{\partial N}\frac{q_0}{\psi_r}\right) h_0 \cdot N_r$$

$$\delta = \frac{\left[-\eta_0 \cdot \psi_r \frac{\partial Q}{\partial N} + h_0 \cdot H_r \left(\frac{\partial Q}{\partial H}\frac{\partial \psi}{\partial N} - \frac{\partial Q}{\partial N}\frac{\partial \psi}{\partial H}\right)\right] q_0}{\left(\psi_r \cdot \eta_0 \frac{\partial Q}{\partial N} + q_0 \cdot Q_r \frac{\partial \psi}{\partial N}\right) h_0}$$

$$y = \frac{\Delta Y}{Y_r} \quad n = \frac{\Delta N}{N_r} \quad h = \frac{\Delta H}{H_r} \quad q = \frac{\Delta Q}{Q_r} \quad pt = \frac{\Delta pt}{pt_r} \quad \eta = \frac{\Delta \psi}{\psi_r}$$

$$\eta_0 = \frac{\psi_0}{\psi_r} \quad pt_0 = \frac{Pt_0}{Pt_r} \quad q_0 = \frac{Q_0}{Q_r} \quad h_0 = \frac{H_0}{H_r}$$

PUMP TURBINE

BACKGROUND OF THE INVENTION

The present invention relates to a pump turbine in which a pump or a turbine can be operated by changing the rotating direction of a runner.

A pump turbine is designed in such a manner as to be operated as a pump or a turbine and to satisfactorily exhibit a centrifugal force action for pumping during a pumping operation so as to achieve a predetermined high pumping head. However, the design for the pumping operation has an adverse influence on a turbine operation, that is, discharge characteristics called S-characteristics. In particular, the S-characteristics are conspicuous in the pump turbine suitable for the high pumping head.

The discharge characteristics of the pump turbine are generally expressed by a group of characteristics curves representing the relationship between a unit speed (N1=N/$\sqrt{H}$) and a unit discharge (Q1=Q/$\sqrt{H}$)) by using a wicket gate opening as a parameter. A turbine operating region includes a part (a first part) at which the value Q1 is decreased as the value N1 is increased, and another part (a second part) at which the value Q1 is decreased as the value N1 is decreased. Furthermore, the first part is divided into a portion (a moderately variable portion at the first part) at which the value Q1 is relatively moderately decreased as the value N1 is increased, and another portion (a sharply variable portion at the first part) at which the value Q1 is relatively sharply decreased as the value N1 is increased. The sharply variable portion at the first part and the second part constitute an S-characteristics section.

In a generating mode of the pump turbine, a normal operation is performed at the moderately variable portion at the first part. However, since a wicket gate opening is about a no-load opening on starting, which is smaller than that in a normal operation with a load, and the value N1 exhibiting the S-characteristics also becomes small, an operating point not only relatively approaches the S-characteristics section but also intrudes into the sharply variable portion at the first part of the S-characteristics section in some cases. In particular, it becomes the most severe when synchronizing and paralleling of a pumping-generating plant with the power line is required at a lowest head at which the unit speed N1 becomes highest. Needless to say, since the speed is low at the beginning of the starting of operation, the unit speed N1 also is low, and therefore, is considerably apart from the S-characteristics section, thereby achieving stable acceleration. As the speed approaches a rated speed, the speed is started to be influenced by the S-characteristics. When the unit speed N1 falls within the first part of the S-characteristics section, a gradient ∂Q1/∂N1 becomes abruptly steep, and thus, discharge fluctuations with respect to speed fluctuations become great, that is, a water hammer becomes great, thereby deteriorating the stability of the speed government by a governor. Moreover, since the turbine discharge is increased from zero up to a no-load discharge on starting, the situation becomes severer with the influence of the resultant transient water hammer. As a consequence, the speed fluctuations cannot be suppressed at all around the lowest head, and therefore, the plant cannot be synchronized with or put on a power line in some cases. The situation in which the plant cannot be synchronized with or put on the power line signifies that the plant cannot be operated at that head, thus leading to an enormous loss. In the case of the pump turbine, as the head becomes greater, the runner must be formed into a flatter shape and in a larger diameter in order to exhibit desired pumping characteristics. Therefore, the unit speed N1 exhibiting the S-characteristics tends to be lower at the same wicket gate opening, thereby making the above-described problem more serious.

SUMMARY OF THE INVENTION

The present invention has been accomplished in an attempt to solve the above-described problems observed in the prior art. Therefore, an object of the present invention is to provide a pump turbine, in which the stability of a speed on starting of a turbine can be enhanced and a synchronous head range can be enlarged.

In order to achieve the above-described object, the present invention is directed to switching the rotating direction of a runner so as to enable a pump turbine to be operated in both of a pumping mode and a generating mode; sensing the speed of the runner; controlling a discharge in such a manner as to allow the speed to approach a target speed based on the sensed speed; temporarily setting the target speed to a speed different from a rated speed on starting of power generation; and controlling the response speed of the speed government by the discharge adjustment to a lower level after the speed reaches the target speed than that before the speed reaches the target speed.

Furthermore, in order to achieve the above-described object, a pump turbine according to the present invention comprises a governor configured to control discharge adjusting means in such a manner that the speed of a runner is stationarily set to a command value while sensing the speed of the runner in a generating mode, wherein the transfer function of the governor is switched in a direction in which the stability of the governor can be more improved after the speed is increased up to a temporary target value near a rated speed than before the speed is increased up to the temporary target speed in the case where the pump turbine is started at least at a head smaller than a predetermined head in the generating mode.

Subsequently, a pump turbine according to the present invention comprises a governor configured to control discharge adjusting means in such a manner that the speed of a runner is stationarily set to a command value while sensing the speed of the runner in a generating mode, wherein in the case where the pump turbine is started at least at a head smaller than a predetermined head in the generating mode, the speed command value is temporarily set to a first command value lower than a rated speed, thus temporarily stabilizing the speed and waiting for settlement of a transient phenomenon such as a water hammer, and thereafter, the speed command value is gradually increased such that the speed is allowed to reach a synchronous speed equivalent to the frequency of a power line.

Next, the command value is temporarily set to the first command value, thus temporarily stabilizing the speed and waiting for settlement of the transient phenomenon such as a water hammer, and thereafter, the speed command value is slowly increased to a value corresponding to the rated speed at such rate as to prevent any harmful water hammer, so that the speed is slowly led to the synchronous speed equivalent to the frequency of the power line.

Subsequently, the transfer function of a computation unit in the governor is designed to be switched before and after the speed is increased up to about the rated speed in the case where the pump turbine is started at least at the head smaller than the predetermined head in the generating mode, and the stability of the governor can be more improved after the speed is increased up to about the rated speed than before the speed is increased up to about the rated speed.

Next, in the case where the computation unit in the governor has three elements, i.e., a proportional element, an integral element and a derivative element, a setting value of at least the integral element is switched before and after the speed is increased up to about the rated speed.

Subsequently, the first command value is set to about a speed immediately before a gradient $|\partial Q/\partial N|$ or $|\partial Q1/\partial N1|$ or an equivalent state according to an increase in speed abruptly rises up.

Next, a pump turbine according to the present invention comprises a governor configured to control discharge adjusting means in such a manner that the speed of a runner is stationarily set to a command value while sensing the speed of the runner in the generating mode, the command value is temporarily set to a first command value lower than a rated speed, thus temporarily stabilizing the speed and waiting for settlement of a transient phenomenon such as a water hammer, and thereafter, the command value is gradually increased such that the speed is synchronized with a speed equivalent to the frequency of a power line, and further, the transfer function of the governor is switched in a direction in which the stability of the governor can be more improved under the condition that the speed is increased up to about the rated speed in the case where the pump turbine is started to be driven at least at a head smaller than a predetermined head in the generating mode.

Subsequently, a pump turbine according to the present invention comprises a governor configured to control discharge adjusting means in such a manner that the speed of a runner is stationarily set to a command value while sensing the speed of the runner in the generating mode, the transfer function of the governor is switched in a direction in which the stability of the governor can be improved when the speed reaches about a synchronous speed or higher in the case where the pump turbine is started at least at a head smaller than a second predetermined head in the generating mode, and further, the command value is temporarily set to a fourth command value higher than a rated speed, followed by temporarily stabilizing the speed and waiting for settlement of a transient phenomenon such as a water hammer, and thereafter, the command value is gradually decreased, so that the speed is gradually led to the synchronous speed equivalent to the frequency of a power line in the case where the pump turbine is started at least at a head smaller than a third predetermined head.

Next, the command value is temporarily set to the fourth command value, the speed is temporarily stabilized while waiting for settlement of the transient phenomenon such as a water hammer, and thereafter, the speed command value is gradually decreased at such a rate that no harmful water hammer occurs, so that the speed is slowly led to a synchronous speed equivalent to the frequency of the power line.

According to the present invention, it is possible to enhance the stability of the speed at the time when the turbine is started. Specifically, it is possible to more securely stabilize the speed government when the pump turbine is started in a low head condition, and further, to thus enlarge the operating range of the pump turbine toward the low head. In this manner, it is possible to readily achieve both of the pump performance and the turbine performance in the pump turbine, so as to enhance the performance of the pump turbine.

BRIEF DESCRIPTION OF THE DRAWINGS

FIG. 2 illustrates a linearized model of the pump turbine proposed by the present inventor;

DETAILED DESCRIPTION OF THE PREFERRED EMBODIMENTS

Figure 1:
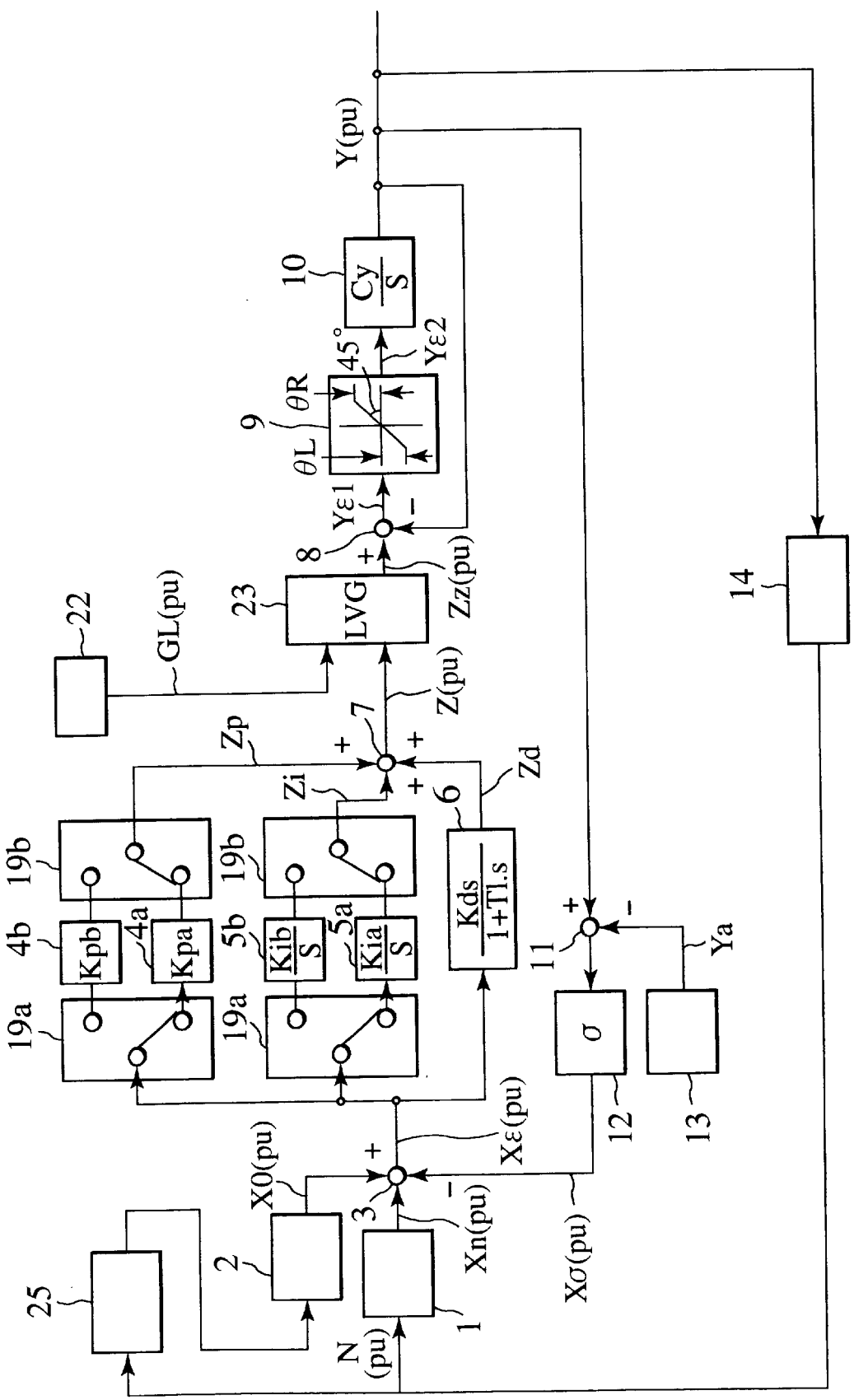
FIG. 1 is a block diagram illustrating the entire speed government system in a pump turbine according to the present invention.

First of all, an explanation will be made below on the concept of the present invention. Preferred embodiments according to the present invention will be described in detail after the explanation of the concept. In general, in the case of a pump turbine, in particular, a pump turbine of a high pumping head, a runner is designed such that a centrifugal force action for pumping can be satisfactorily exhibited in order to achieve a high pumping head during a pumping operation.

However, such design has an adverse influence on a turbine operation of the pump turbine. Here, a description will be first given of S-characteristics. Characteristics called the S-characteristics appear more or less. It is difficult to completely avoid the S-characteristics. The discharge characteristics of the pump turbine are generally expressed by a group of characteristics curves representing the relationship between a unit speed (N1=N/√H) and a unit discharge (Q1=Q/√H) by using a wicket gate opening as a parameter. In contrast, the torque characteristics of the pump turbine are expressed by a group of characteristics curves representing the relationship between the unit speed (N1=N/√H) and a unit torque (T1=T/H) by using the wicket gate opening as a parameter. Here, these two kinds of characteristics curves are generically called performance curves of the pump turbine.

In the above-described discharge characteristics curve, a turbine operating region includes a first part at which the value Q1 is decreased as the value N1 is increased, and a second part at which the value Q1 is decreased as the value N1 is decreased. Furthermore, the first part includes a portion (which will be referred to as a moderately variable portion at the first part) at which the value Q1 is relatively moderately decreased as the value N1 is increased, and another portion (which will be referred to as a sharply variable portion at the first part) at which the value Q1 is relatively sharply decreased as the value N1 is increased. In the present specification, the second part and the sharply variable portion at the first part are referred to as an S-characteristics section in combination for the sake of explanation. In the turbine operation in the S-characteristics section, the unit torque (T1) also includes a first part, at which the torque is decreased as the unit speed (N1) is increased, and a second part, at which the torque is decreased as the unit speed (N1) is decreased, in the same manner as the unit discharge Q1.

A normal operation in a generating mode of the pump turbine is performed at the moderately variable portion at the first part. However, the S-characteristics section approaches the range of the unit speed N1 during the normal operation as a turbine output becomes smaller even with the same effective head, that is, even at the same unit: speed N1. Consequently, the unit speed N1 of the machine operated at no-load with a lowest effective head most approaches to the S-characteristics, so that an operating point intrudes into the S-characteristics section, to be often located at the sharply variable portion at the first part. In particular, in the case where the pump turbine is started in the generating mode, it is necessary to increase the discharge at least from zero to a discharge equivalent to no load. Since the discharge change is accompanied with some water hammer it becomes more likely that the operating point deeply intrudes into the S-characteristics section in the transient state.

Figure 14A:
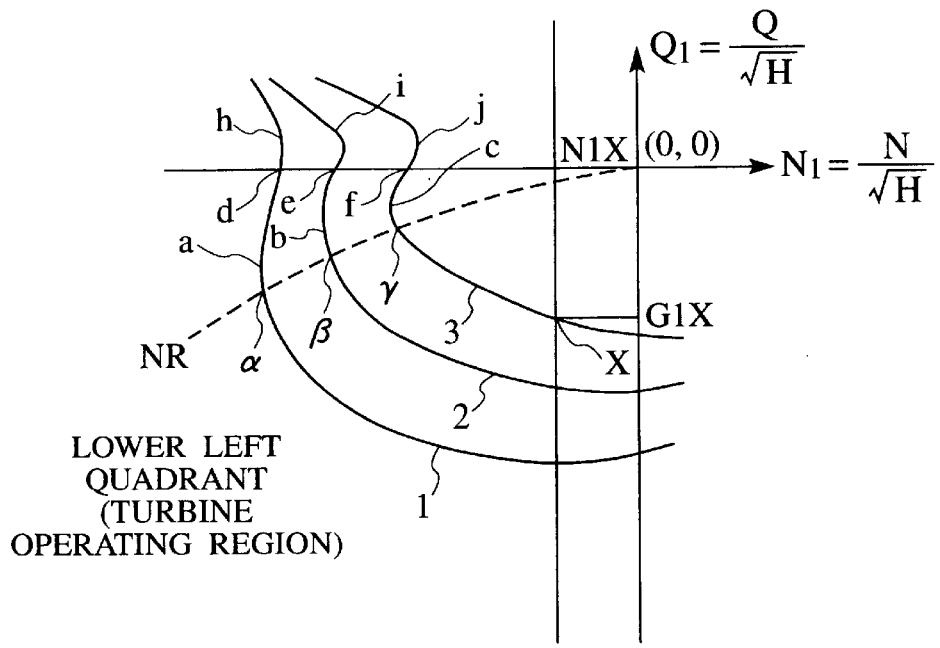
FIGS. 14A and 14B are graphs illustrating the characteristics of the pump turbine.
Figure 14B:
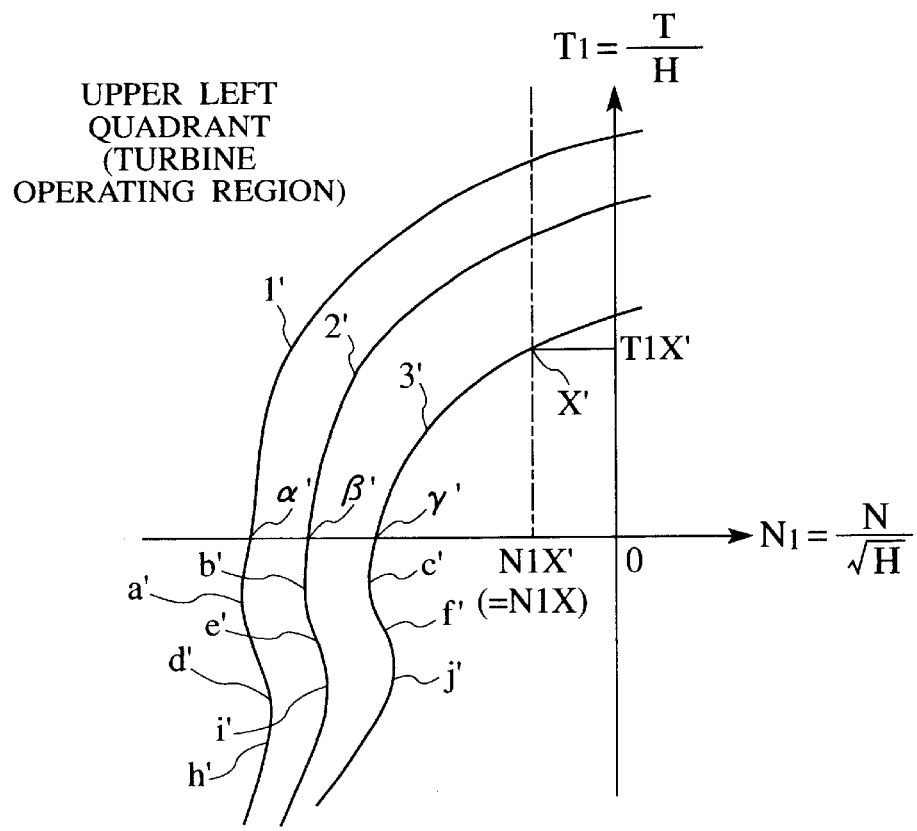

FIGS. 14A and 14B illustrate the characteristics of the pump turbine having the S-characteristics in the turbine operating region. In FIG. 14A, the characteristics of the pump turbine are illustrated by way of the relationship between the unit speed (N1) and the unit discharge (Q1) by using the wicket gate opening as the parameter. In contrast, in FIG. 14B, the characteristics of the pump turbine are illustrated by way of the relationship between the unit speed (N1) and the unit torque (T1) by using the same parameter.

In the above description, reference characters N, Q, H and T designate the speed, discharge, effective head and torque of the pump turbine, respectively.

Characteristics curves 1 and 1' are achieved at a predetermined relatively great wicket gate opening; characteristics curves 2 and 2' are achieved at a wicket gate opening smaller than the above-described wicket gate opening; and further, characteristics curves 3 and 3' are achieved at a wicket gate opening much smaller than the above-described wicket gate opening.

At a second portion of the characteristics curve 1, i.e., at a portion indicated by a curve a-d-h, a value Q1 is decreased as a value N1 is decreased. In the same manner, at a portion indicated by a curve b-e-i, i.e., at a second portion of the characteristics curve 2, the value Q1 is decreased as the value N1 is decreased. Furthermore, at a portion indicated by a curve c-f-j, i.e., at a second portion of the characteristics curve 3, the value Q1 is decreased as the value N1 is decreased in the same manner. As is obvious at a glance, the second portion a-d-h of the characteristics curve 1 is longer than the second portion b-e-i of the characteristics curve 2, which is further longer than the second portion c-f-j of the characteristics curve 3. This signifies that the S-characteristics section becomes shorter as the wicket gate opening becomes smaller.

Like in FIG. 14A, curves a'-d'-h', b'-e'-i' and c'-f'-j' represent second portions of characteristics curves 1', 2' and 3', respectively, also in FIG. 14B.

FIG. 14B has a close connection to FIG. 14A. For example, a point x satisfying Q1=Q1x and N1=N1x on the curve 3 in FIG. 14A corresponds to a point x' on the curve 3' in FIG. 14B. The point x' satisfies T1=T1x' and N1=N1x' (=N1x). Similarly, the points a, b, c, d, e, f, h, i and j in FIG. 14A correspond to the points a', b', c', d', e', f', h', i' and j' in FIG. 14B, respectively. A curve NR is a no load operation curve in which a unit discharge Q1 corresponding to the required discharge for no load operation is plotted against a unit speed N1 corresponding to a given speed. Intersections α, β and γ of the curves 1, 2 and 3 with the curve NR correspond to intersections α', β' and γ' of the curves 1', 2' and 3' with a straight line T1=0, respectively.

On the assumption of starting in a generating mode, it is necessary to increase the speed from 0 to a rated speed $N_0$ as a load of a generator (a turbine output) remains being 0. This signifies that the operating point is shifted leftward from an origin (N1=0, T1=0) at stoppage to an intersection of a horizontal line of T1=0 with a vertical line of N1=$N_0$/√H from the viewpoint of the above-described N1-T1 characteristics. For example, in the case where the intersection of the horizontal line of T1=0 with the vertical line of N1=$N_0$/√H determined by H at that time falls between points α' and β' at the time when the unit speed N is increased up to $N_0$, the wicket gate opening need be opened between the curves 1 and 2. In the meantime, the operating point is shifted from the origin (N1=0, Q1=0) to a middle point between the points α and β on the line NR in observing the above-described turbine starting from the viewpoint of the N1-Q1 characteristics. That is to say, Q1 need be increased from 0 to a value between Q1 at the point α and Q1 at the point β, and the discharge Q need be increased up to corresponding value. Here, in the case where the generator connected directly to the turbine is a synchronous generator, the speed for putting the generator on the power line, i.e., the rated speed $N_0$ is not varied while the unit speed N1 is varied to be greater or smaller according to the head.

In other words, in the case of the lowest head, the speed need be synchronized with the frequency of the power line at the maximum unit speed N1. In this case, the operating point is deviated from the moderately variable portion at the first part on the discharge characteristics curve, and thus, is located at the sharply variable portion at the first part. Here, since the pump turbine runner must be formed into a flatter shape as the design head becomes higher, it is inevitable that the S-characteristics tend to be shifted down to a lower level of N1. Consequently, the operating point will intrude into or abnormally approach the S-characteristics section on starting at the lowest head in the pump turbine of the high head.

As a result, even if the speed is increased up to about the rated value, fluctuations are repeated thereafter, thereby raising a problem that the generator cannot be smoothly synchronized. The situation that the generator cannot be synchronized signifies that the generator cannot be used as the generating plant, thus leading to an enormous loss.

Figure 8:
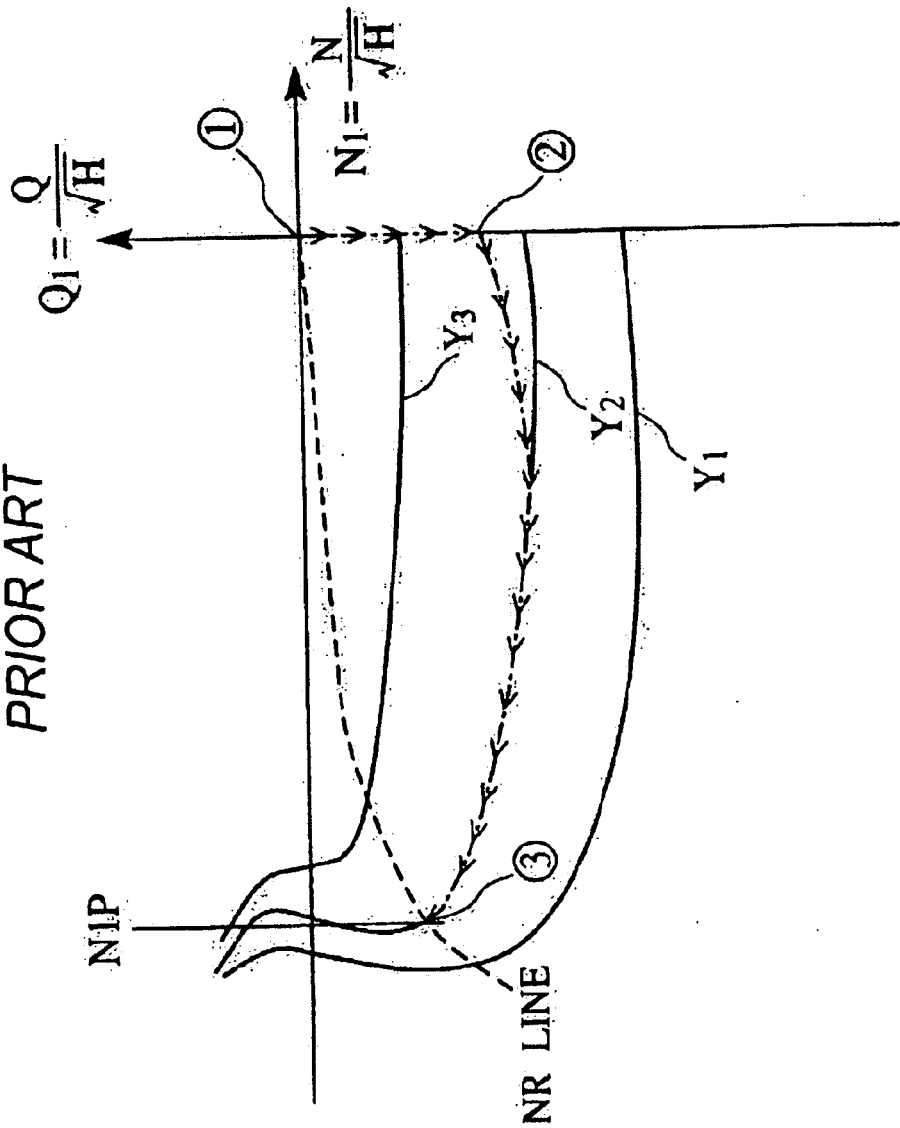
FIG. 8 is a graph illustrating the trajectory of the operating point in the starting method by way of an example of the pump turbine.

FIG. 8 is a graph illustrating the trajectory of the operating point of the pump turbine which is started in the generating mode in the typical prior art, wherein Y2 represents N1-Q1 characteristics achieved at such a wicket gate opening that the speed at no load is increased up to just the rated speed, that is, a characteristic curve at a no-load opening; Y3 represents the N1-Q1 characteristics achieved at a wicket gate opening slightly smaller than the no-load opening; and Y1 represents the N1-Q1 characteristics achieved at a wicket gate opening slightly greater than the no-load opening. The operating point before the starting is plotted at a point ①, where N1=0 and Q1=0. A wicket gate is started to be opened by giving a starting command to the governor, and then, by opening a load limit for limiting an upper level of a wicket gate opening command signal output from the governor. However, the turbine has not been yet started to be operated at this moment, and therefore, the operating point of the pump turbine is shifted from the point ① to a point ② in FIG. 8. When the operating point reaches the point ②, an increase in the speed is started. Thereafter, the speed is continuously increased under the control of the governor. At this stage, the operating point of the pump turbine is shifted from the point ② to a point ③. More specifically, a synchronizer for producing a pulse signal and controlling a speed changer in the governor is turned on while comparing the actual speed of the pump turbine with the synchronous speed equivalent to the frequency of the power line immediately before N1 reaches N1P equivalent to the rated speed (that is, from N1 slightly lower than N1P). Thereafter, the speed is synchronized by a double control, that is, by both of the governor for governing the speed to a given speed changer setting and the synchronizer for controlling the speed changer setting to the synchronous speed.

However, in the case where the point ③ abnormally approaches or intrudes into the S-characteristic section on starting at the low head, as illustrated in FIG. 8, synchronization may no longer be possibly taken. The reason for this is that only the governor is responsible for the approach of the operating point to the point ③ and there is no means for accurately suppressing fluctuations caused by a water hammer.

Since a gradient $\partial Q1/\partial N1$ abruptly rises near the point ③, the change is extremely rapid in view of the discharge and there is a possibility of a sensitive reaction of a water hammer even if the speed is to slowly approach the synchronous speed by regulating the governor.

The speed governor is adapted to control the pump turbine and the generator. The present inventor has elucidated that a machine to be controlled can be subjected to a linearized model with sufficient accuracy, as illustrated in FIG. 2, on the assumption of a fine change in the vicinity of an initial condition. In FIG. 2, reference character y represents a wicket gate opening (p.u.) as an input for the machine to be controlled; pt, an output (p.u.) of the turbine; and n, a speed (p.u.) as an output for the machine to be controlled. Furthermore, reference character Tm represents a mechanical starting time (sec) of the rotating parts, which is equivalent to $I(2\pi/60)^2 N_0^2/P_0$; and Tw represents a water starting time (sec) of the water columns, which is equivalent to $\Sigma(Li.Vi)/(g.H)$, wherein reference character I denotes a secondary moment of inertia; $P_0$, a rated output of the turbine; Li, a length of each water column; Vi, a flow rate inside of each water column at the time of the rated output; g, a gravitational acceleration; and S, a Laplace operator. Moreover, Greek alphabets α, β, γ, ε and δ are defined as additionally expressed in FIG. 2, respectively. Here, Greek alphabet Ψ represents the efficiency of the turbine. In addition, subscript r denotes a rated value; and subscript 0 denotes an initial value of a point: which is subjected to the linearized model.

The present inventor has further discovered the following fact: the stability of the speed government system by the governor cannot be markedly deteriorated since each of α, β and γ takes a positive value even if the operating point is plotted near the S-characteristics section when the operating point is plotted at the moderately variable portion at the first part on the N1-Q1 characteristics curve; in contrast, β is abruptly converted into a negative value at the sharply variable portion at the first part where N1 is slightly greater, thereby inducing a tendency of abrupt deterioration of the stability of the speed government system by the governor. By way of a specific example, β is a positive value at an operating point ③A in FIG. 6; in contrast, it is a negative value at the operating point ③. In view of this tendency, if N1 becomes higher, that is, N becomes higher, the deterioration of the characteristics of the pump turbine as described above should be compensated by changing the governor settings so that the stability of the governor is further enhanced.

Figure 6:
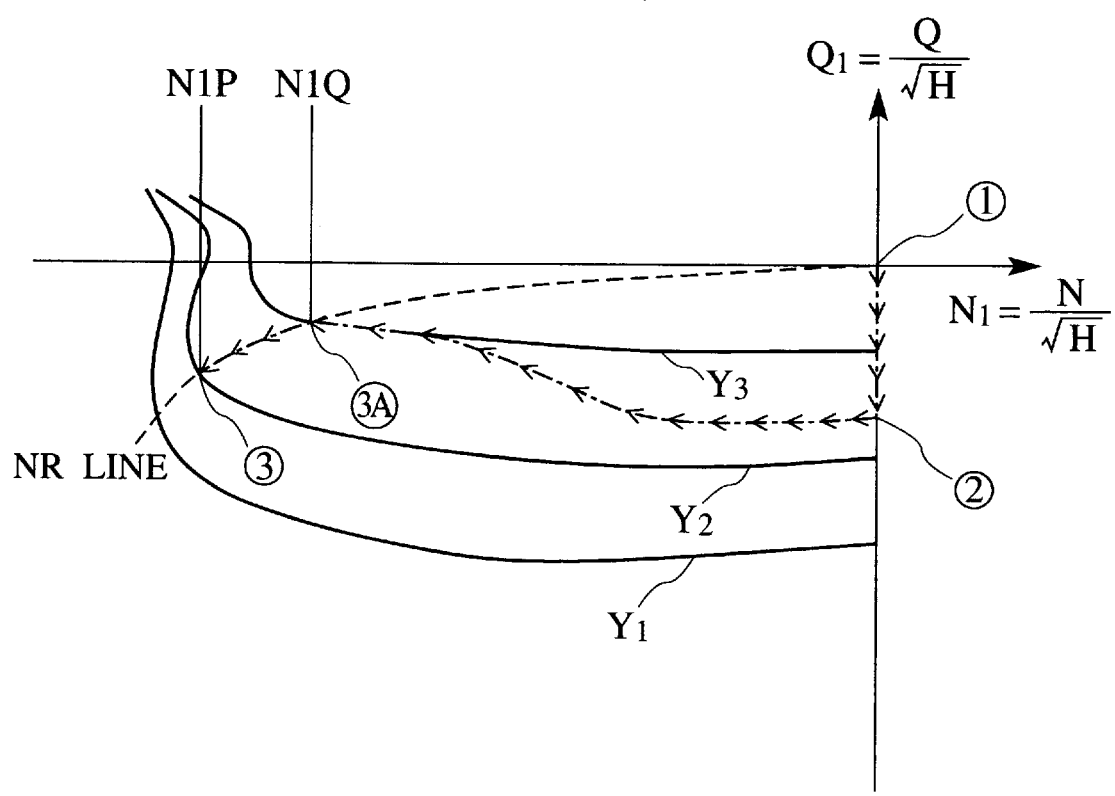
FIG. 6 is a graph illustrating an example 1 of the trajectory of an operating point in a method for starting the pump turbine according to the present invention.

Furthermore, in view of the tendency illustrated in FIG. 6, the speed is temporarily stabilized in the stage in which N1 is increased up to about N1Q (i.e., around the operating point ③A) at β having an unchanged sign, and thus, a transient phenomenon such as a water hammer is substantially settled. Thereafter, it is rational to increase the speed (i.e., N1) enough moderately not to generate any harmful water hammer till the operating point ③. In this manner, the speed can be relatively smoothly synchronized with the frequency of the power line at the operating point ③.

Moreover, the operation from the operating point ③A to the operating point ③ can be achieved by slowly raising the speed changer in the governor. When the speed approaches the synchronous speed, the synchronizer is turned on somewhere on the way, and then, the speed changer is turned into a synchronous control mode by the synchronizer. In this case, the synchronizer should be adjusted in such a manner as to be operated sufficiently slowly in consideration of the above-described fact.

In general, the operating point at which the synchronization is taken on starting in the generating mode abnormally approaches the S-characteristics section only at an extremely low head. Accordingly, the stabilization enhancement of the governor, which is performed when the speed is increased up to about the rated value, is switched by putting a predetermined head or lower into the condition.

Additionally, only a gain of an integral element is switched so as to avoid any bump phenomenon at the time of switching in the case where the computation unit of the governor is of a PID type. Although a slight bump occurs at the time of switching in the case of a gain of a proportional element, it generally marks a permissible level.

Furthermore, like at the above-described operating point ③A illustrated in FIG. 6, a region, in which the operating point approaches the S-characteristics section but the sign of β remains positive, is a region immediately before the discharge reduction gradient $|\partial Q/\partial N|$ or $|\partial Q1/\partial N1|$ or an equivalent state amount according to the increase in speed abruptly rises up. Therefore, it is rational to set the first speed command value near the above-described region.

Additionally, more effective measures of the starting at a low head can be achieved by combining the idea of enhancing the stability of the governor near the rated speed, as described above, with an idea in which the speed is temporarily set to the first command value in a speed increasing process, and then, is slowly increased.

Figure 7:
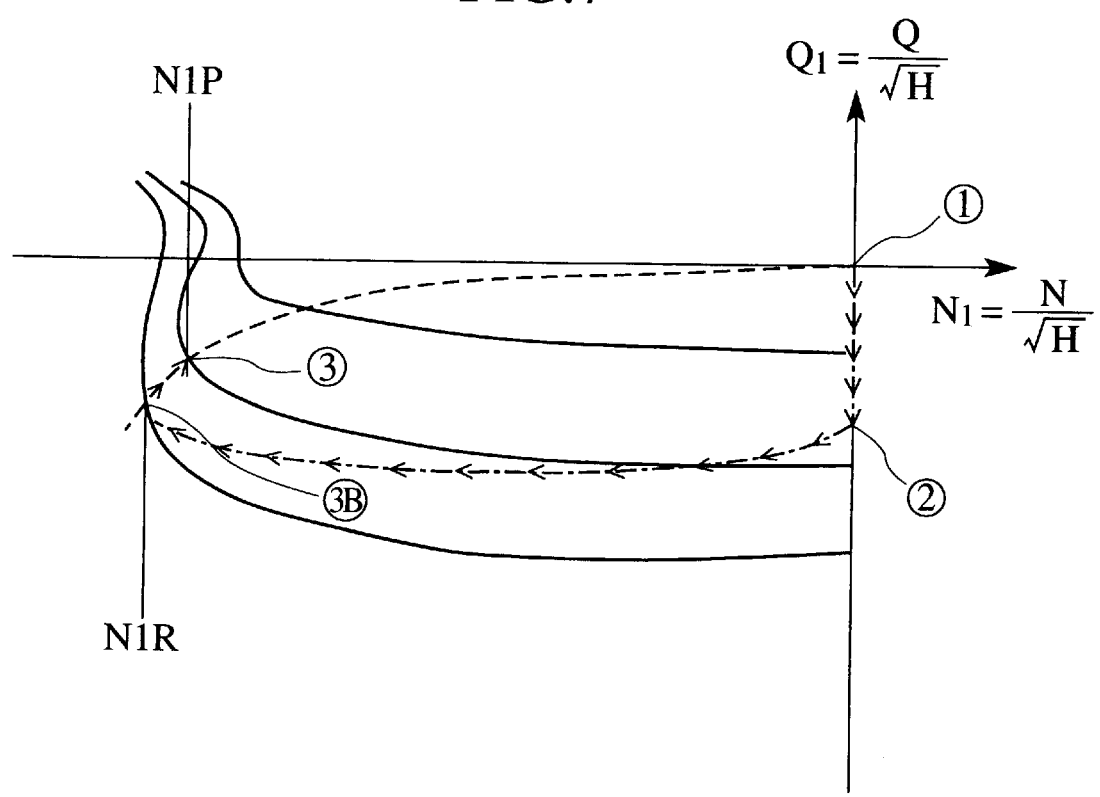
FIG. 7 is a graph illustrating an example 2 of the trajectory of the operating point in the method for starting the pump turbine according to the present invention.

Furthermore, as illustrated in FIG. 7, the operating point is shifted from the point ② to a point ③B, at which the speed is higher than the rated speed, while increasing the speed, and then, the speed is temporarily held here. In this case, the governor can be temporarily stabilized by adopting the idea of enhancing the stability of the governor near the rated speed, as described above. In addition, the operating point is meta-statically shifted from ③B to ③ while the speed is sufficiently slowly decreased, and then, the operating point can be synchronized smoothly. Also in this case, it is not only the governor that is responsible for the discharge immediately before the synchronization. In other words, since the discharge change speed can be adjusted, this idea is excellent in soft shifting to the operating point ③.

Moreover, since the water hammer is temporarily suppressed at the operating point ③B, the decrease in speed change governed by the governor is sufficiently suppressed in such a manner as to prevent any harmful water hammer in the stage in which the operating point is shifted from to ③B to ③, thereby achieving smooth synchronization. In this case, the synchronizer for controlling the speed changer in the governor is designed to be actuated not in a speed increasing process from the point ② to ③B but in a speed decreasing process from the point ③B to ③ in order to synchronize the speed of the pump turbine with the frequency of the power line. Needless to say, also in this case, limitation is provided, as necessary, such that a decreasing speed by the speed changer in the governor cannot become excessive.

Prior to the explanation of preferred embodiments according to the present invention, a simulation analysis exemplifies the starting of the pump turbine in the generating mode as illustrated in FIG. 8.

Figure 5:
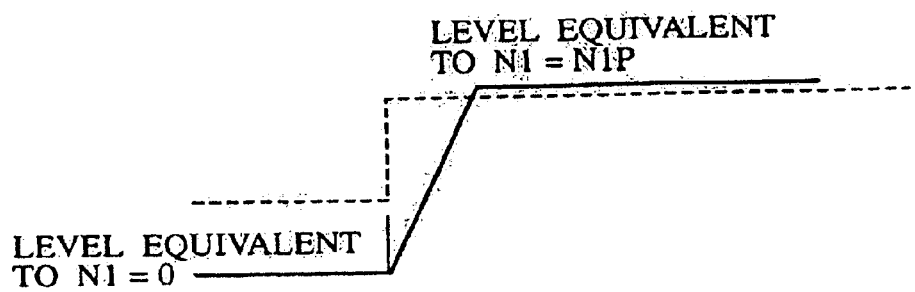
FIG. 5 is a diagram illustrating a method for operating the speed changer on starting by way of an example of the pump turbine.
Figure 9:
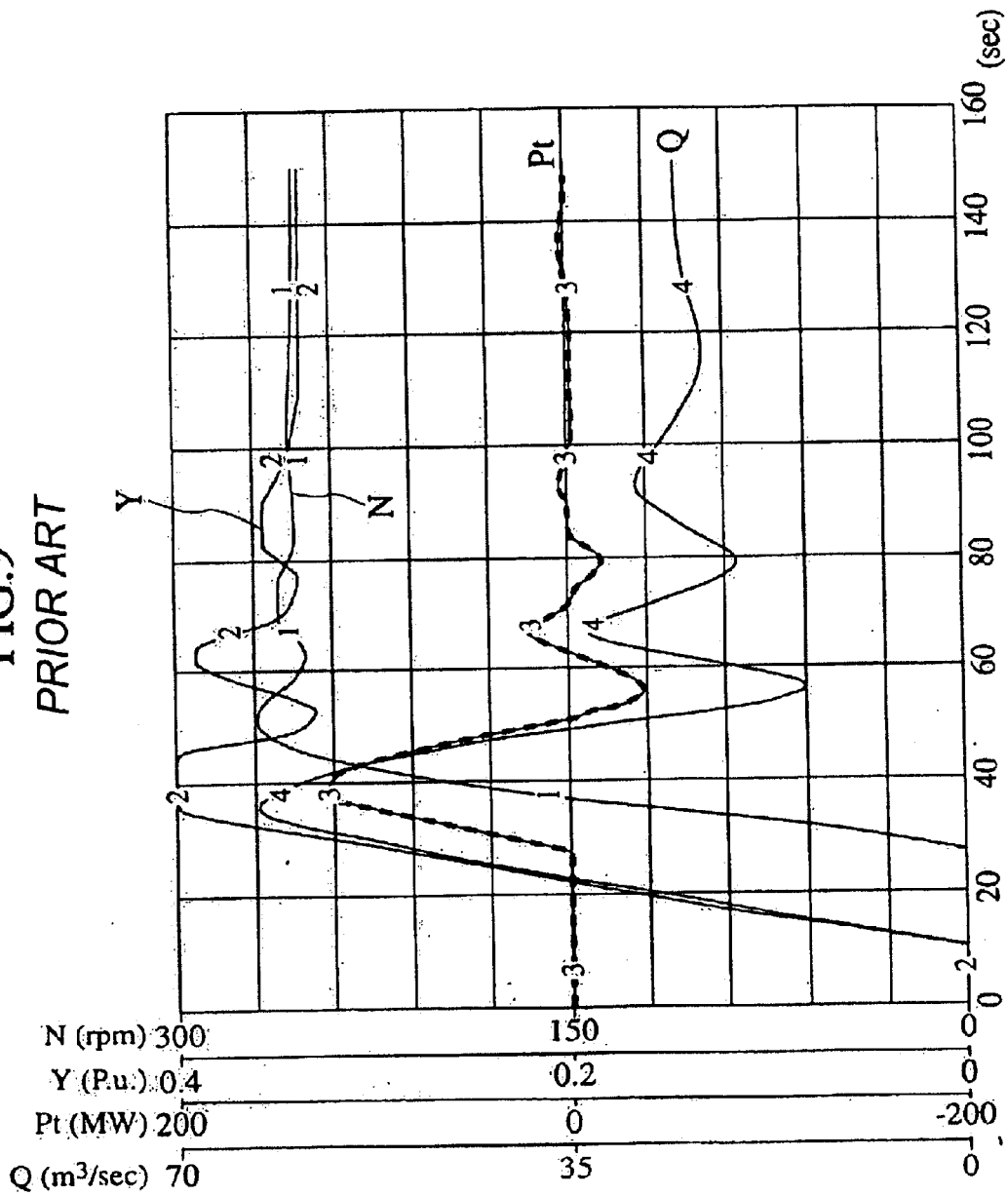
FIG. 9 is a diagram illustrating the behavior of the pump turbine on starting by way of one example (in the case of a low head)
Figure 10:
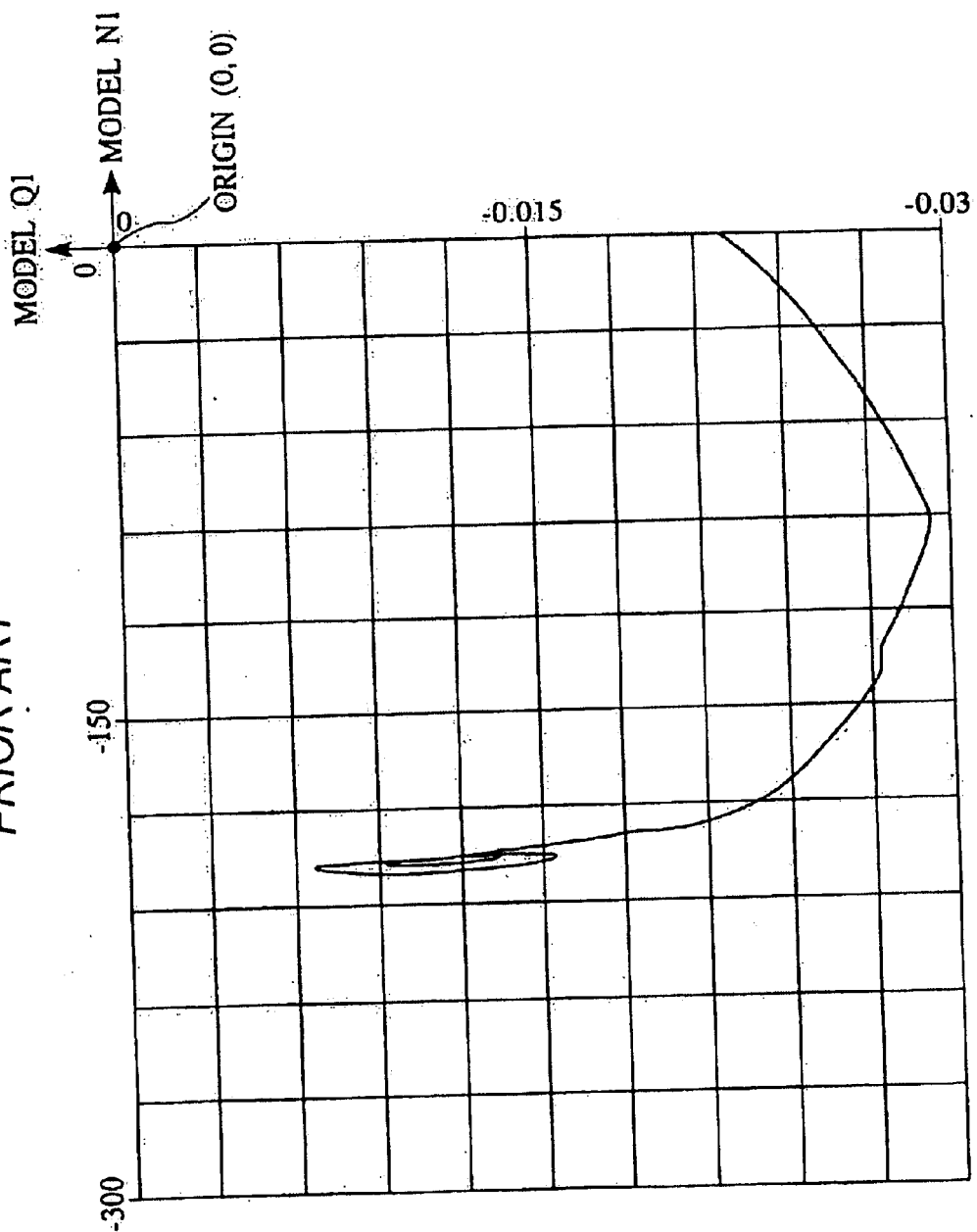
FIG. 10 is a diagram illustrating the trajectory of the operating point on a model turbine conversion plane on starting of the pump turbine by the technique illustrated in FIG. 9.
Figure 11:
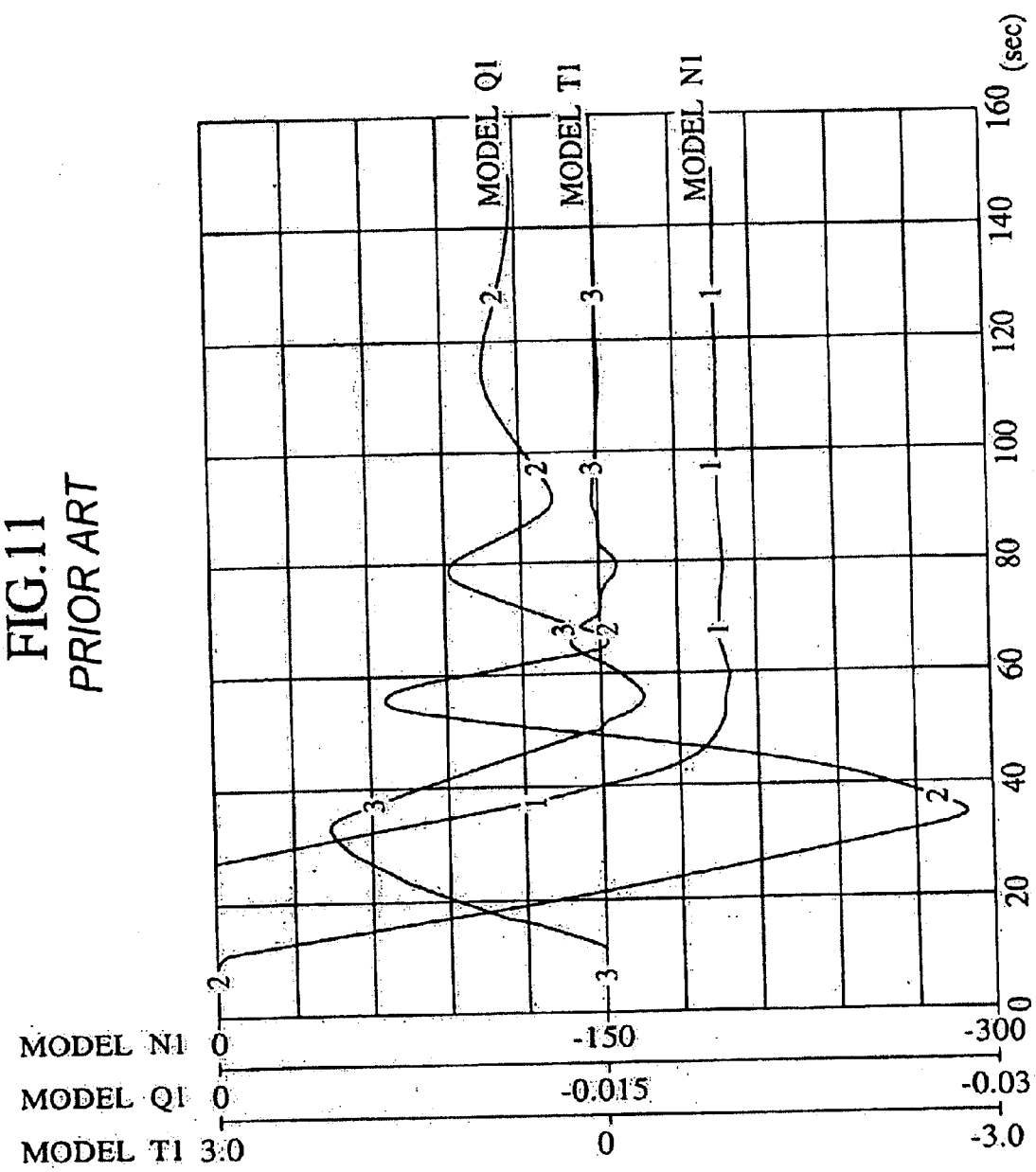
FIG. 11 is a graph illustrating a response of each of model turbine conversion variables on starting of the pump turbine by the technique illustrated in FIG. 9.

FIG. 9 illustrates one of charts obtained by the simulation analysis, being a graph illustrating time responses of N, Y, Q and Pt. In this case, the speed changer in the governor is set to 1.0 (p.u.) equivalent to a rated speed of 257 rpm prior to a starting operation, as indicated by a solid line or a dotted line in FIG. 5. Furthermore, a gate limit also is set to a predetermined value (0.4) which is slightly higher than a no-load opening (about 0.28) prior to the starting operation. Moreover, the pump turbine is assumed to start its rotation at the time when the wicket gate opening reaches up to 0.29 (p.u.). Incidentally, gains Kp, Ki and Kd of the governor are set to 1.07, 0.0743 and 0.924, respectively. Here, Tw is 2.88 (sec) and Tm is 10.3 (sec). As a result, although N appears to be smoothly converged on the rated speed, the discharge is largely overshot, and thereafter, is considerably largely fluctuated. Therefore, it is considered that fluctuations with fear of synchronization occur together with a significant water hammer. In other words, this is because it is assumed that the characteristic curve of the pump turbine cannot be fluctuated despite of fluctuations caused by a water hammer in this simulation analysis: namely, the condition is provided milder than actually. FIG. 10 is another chart obtained by this simulation analysis, and illustrates the trajectory of the operating point on the plane N1-Q1 which is converted into a model turbine. As is obvious from this graph, the stability of the speed governor system is extremely deteriorated as N approaches the rated speed: that is, it is found well that Q1 is greatly fluctuated even if N1 is hardly changed. FIG. 11 is a chart which can provide additional information for FIG. 10, illustrating a response of each of N1, Q1 and T1 converted into the model turbine.

Subsequently, a description will be given of the configuration of the pump turbine. FIG. 1 is a block diagram illustrating the pump turbine in a preferred embodiment according to the present invention. Reference numeral 1 designates a speed sensor for sensing the speed N of a turbine; Xn, a speed sensing signal output from the speed sensor; 2, a speed changer for setting a reference value of the speed; and X0, a setting value set by the speed changer 2. Reference numeral 3 denotes an adder for collating a difference between the setting value X0 set by the speed changer 2 and the speed sensing signal Xn, i.e., a speed deviation signal X0-Xn with a restoring signal Xσ output from a speed droop setter. The resultant control deviation signal Xε is input into a PID computation circuit constituting a main computation unit in the speed governor.

A proportional element (a P element) 4a set to a relatively high gain so as to achieve a relatively quick response of the governor is used during the fore half of the starting in the generating mode, i.e., after the stoppage until the speed is increased up to the first command value; in the meantime, another proportional element (a P element) 4b set to a relatively low gain so as to enhance the stability is used when the speed exceeds the first command value. A pair of contacts 19a and 19b are adapted to switch the gain, and each of them is a certain kind of speed relay contact. Naturally, a gain Kpa of the former proportional element is greater than a gain Kpb of the latter proportional element. Similarly, another pair of contacts 19a and 19b switch an integral element (an I element) 5a used after the stoppage until the speed is increased up to the first command value and another integral element (an I element) 5b used under the condition that the speed exceeds the first command value. Here, a gain Kia of the former integral element is greater than a gain Kib of the latter integral element. Incidentally, the contacts 19a and 19b are simultaneously swung to open the lower contact while close the upper contact. The reason why the two pairs of contacts 19a and 19b are provided is that the proportional elements and the integral elements are switched at the same time.

An output signal Zd is output from a derivative element 6 (a D element). Furthermore, an output signal Zp of the proportional element and an output signal Zi of the integral element are output from the contacts 19b, respectively.

These three output signals are added by an adder 7, and the resultant output Z indicates a wicket gate opening command determined by the main computation unit in the speed governor. Reference numeral 23 designates a low value gate (hereinafter abbreviated to an LVG), i.e., a low value selecting circuit, which compares two inputs Z and GL so as to output the lower signal as a final wicket gate opening command Zz. Reference numeral 22 denotes a gate limit or a load limit. Reference character GL indicates an upper limit value of a wicket gate opening set by the gate limit or the load limit. That is to say, the aforementioned name has been given since the output from the LVG 22 remains limited to GL however great the wicket gate opening command Zz is output from the main computation unit of the governor.

In the meantime, an actual wicket gate opening is represented by a signal Y. Another adder 8, a limiter 9 and a wicket gate servomotor 10 constitute a sort of hydraulic amplifier. Thus, the adder 8, the limiter 9 and the wicket gate servomotor 10 provide a first-order-lag function with a response speed limiter, which is an amplifier for amplifying the final wicket gate opening command Zz so as to convert it into the wicket gate opening Y having a stroke and operating force enough to directly actuate the wicket gate serving as the discharge adjusting means. $Y\epsilon 1$ designates a deviation between the final wicket gate opening command Zz and the actual wicket gate opening Y. $\theta R$ of the limiter 9 is used to limit an opening speed of the wicket gate into $\theta R.Cy$; and $\theta L$ is used to limit a closing speed into $\theta L.Cy$. $Y\epsilon 2$ denotes a signal obtained by limiting the deviation signal $Y\epsilon 1$ in consideration of the aforementioned opening/closing speed limits. Although the signals $Y\epsilon 1$ and $Y\epsilon 2$ and the limiter 9 have been explained above by way of the image in the block diagram, it may be assumed in a specific product image that $Y\epsilon 1$ denotes a displacement of a distributing valve plunger before a displacement limit is given; and $Y\epsilon 2$, a displacement of the distributing valve plunger after the displacement limit has been given.

Here, a power changer 13 gives a wicket gate opening setting signal Ya into a further adder 11, wherein Ya is a signal equivalent to a no-load opening on starting in the generating mode. In the case where the actual wicket gate opening Y is smaller than Ya, an opening signal $\sigma(Ya-Y)$ is continuously sent to the PID computation unit in the governor until the difference therebetween becomes zero, and finally, Y becomes equal to Ya, when the opening is settled in this stage. A speed droop setter 12 is a unit for setting the above-described coefficient $\sigma$. In other words, $\sigma$ is a gain for determining a rate of a change in wicket gate opening Y with respect to a change in speed sensing signal Xn, and in general, is not varied after it has been once determined in consideration of the function of the plant in the power line, that is, the load sharing rate. Furthermore, reference numeral 14 designates a plant in which the turbine including a water column system and the generator are integrated with each other.

Figure 12A:
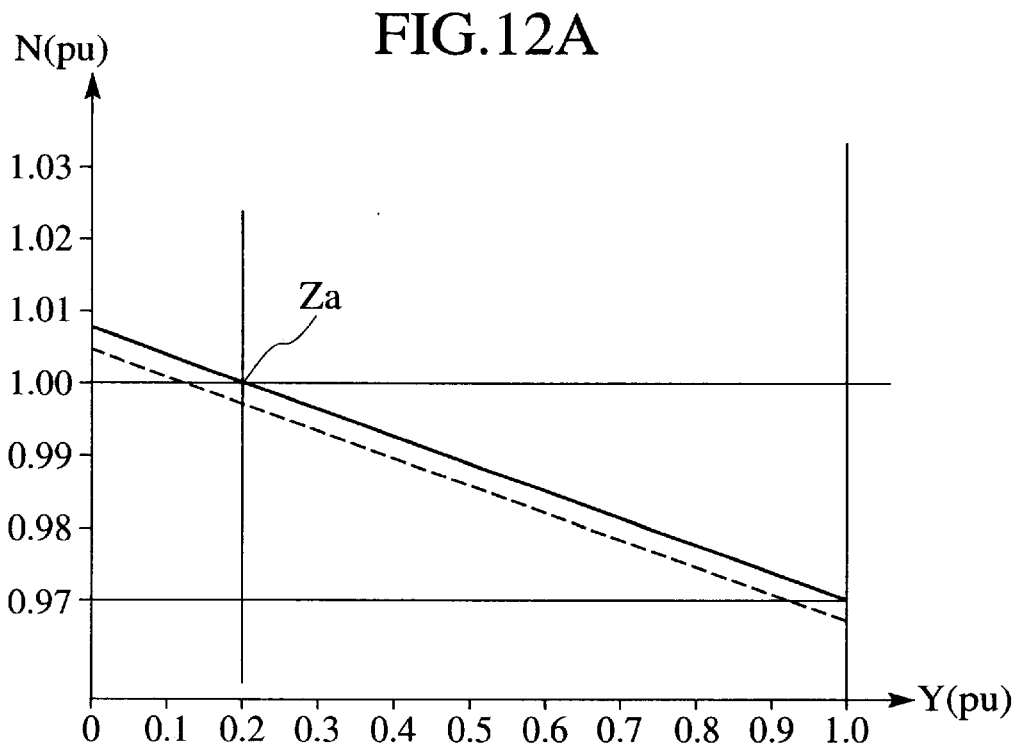
FIGS. 12A and 12B are graphs illustrating the functions of speed changer and speed droop by a governor.
Figure 12B:
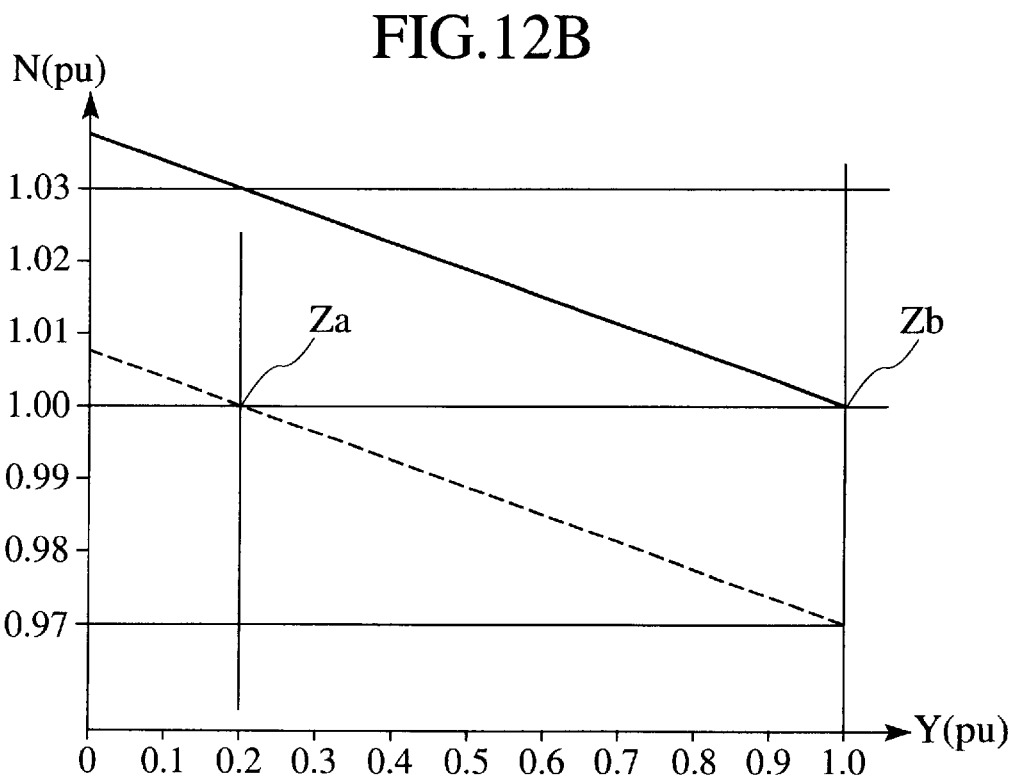

Hereinafter, the functions of the speed changer 2, the power changer 13 and the speed droop setter 12 will be explained in reference to FIGS. 12A and 12B. Here, the wicket gate opening at the time of no load is assumed to be 0.2 (p.u.). A solid line declined rightward in FIG. 12A indicates the state immediately before the concerned plant is connected to the power line. That is to say, an intersection of a line indicating the rated value N (the synchronous speed) with the solid line indicates the wicket gate opening, wherein it is plotted just at a no-load opening of 0.2. Incidentally, the solid line is set below this position before the turbine is started: for example, it is set as indicated by a dotted line in FIG. 12A. In this manner, it is the speed changer 2 that vertically shifts the solid line in parallel below the solid line in FIG. 12A. The speed changer 2 is named since the intersection on the line of the no-load opening of 0.2 is vertically shifted when the solid line is vertically shifted in parallel. In contrast, the state after the plant has been connected to the power line will be explained in reference to FIG. 12B. In this case, the intersection of the solid line with the rated speed is plotted at a point of Y=1.0: namely, during operation with 100% of a load. The solid line illustrated in FIG. 12A when the plant is put on the power line corresponds to a dotted line in FIG. 12B. It is the power changer 13 that shifts the solid line in parallel in the above-described manner so as to change the wicket gate opening. The power changer 13 is named since it shifts the solid line in parallel in a horizontal direction, although the intersection on a line of N=1.0 is laterally shifted together with the horizontal shift of the solid line since the speed is fixed to 1.0 in fact in the state connected to an infinite power line. In case of the setting of the solid line in FIG. 12B, although the operation is normally performed at N of 1.0 and Y of 1.0, Y becomes 0.2 if the frequency of the power line is increased by 3% so that N becomes 1.03. If an increase width of the frequency of the power line is 1.5%, Y is closed to 0.6. It is the speed droop setter 12 that gives the proportional relationship between the frequency change width and the wicket gate displacement width in this manner. As the gain of the speed droop setter 12 is increased, the rightward declining gradient of the solid line in FIG. 12B becomes steeper, so that the gain of the response width of the wicket gate opening is decreased with respect to the change in frequency.

FIG. 6 illustrates the trajectory of the operating point in which the pump turbine according to the present invention is started in the generating mode. An operating point before the starting is plotted at ①, the coordinates of which are N1=0 and Q1=0. In this stage, the speed changer in the governor is set to a first command value equivalent to N1=N1Q significantly lower than N1=N1P equivalent to the rated speed (for example, 0.95 N1P). Specifically, the speed changer is set as indicated by a solid line or a dotted line in FIG. 3. In this state, the opening of the gate limit 22 is gradually opened. In this stage, the wicket gate opening command Z of the governor by itself is given to fully open the wicket gate, that is, to set it to 1.0 (p.u.), as illustrated in FIG. 12A, so that the setting value GL (during an opening operation from 0 to a starting opening greater than the no-load opening, for example, 0.4) from the gate limit 22 is much smaller. Consequently, GL is output as it is as the final wicket gate opening command Zz. Thus, the opening of the gate limit 22 is opened to 0.4 wider than a breakaway opening, whereby an increase in the speed is started in the stage in which the generating torque of the turbine exceeds a static frictional torque of the rotating parts such as the runner. The operating point at this time is indicated by ②. Here, the setting value GL is kept as it is until the plant is connected to the power line to start an inherent generating operation after the setting value GL from the gate limit 22 reaches a predetermined opening (for example, 0.4) for the starting. In this way, the operating point of the plant is shifted from ② to ③A in FIG. 6, at which N1=N1Q as the speed is increased. Here, when N1 is located near N1Q, the influence of the S-characteristics is small and the gradient $\partial Q1/\partial N1$ or $\partial T1/\partial N1$ is still moderate, so that a coefficient $\beta$ of the above-described linealized model still remains positive. Therefore, the speed government by the governor is remarkably stable, thereby speedily performing the starting operation. Even if the operating point can be shifted from ① to ③A in a relatively short time, it is not difficult to temporarily stabilize the speed at the point ③A so as to settle the water hammer. Furthermore, it is effective that the gains of the governor are switched from Kpa and Kia to Kpb and Kib, respectively, on the stable sides by using the contacts of a speed relay 19 before the operating point reaches ③A.

Figure 3:
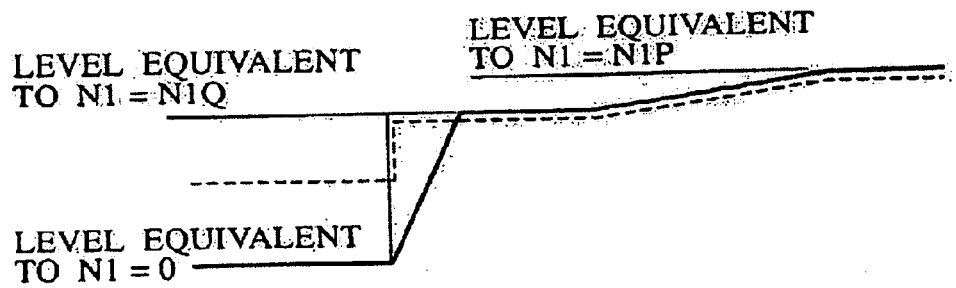
FIG. 3 is a diagram illustrating an operating example 1 of a speed changer on starting of the pump turbine according to the present invention.

Thereafter, the speed changer in the governor is set to be extremely moderately (or meta-statically) raised from a level equivalent to N1=N1Q to a level equivalent to N1=N1P, as illustrated in the latter half of FIG. 3. In particular, the speed changer need be operated moderately enough to prevent the water hammer, which has been once settled at the operating point ③A, from being excited again to a harmful level. In this case, the operating point is gradually shifted along an NR line (a run-away speed line) from the point ③A to the point ③, as illustrated in FIG. 6.

A synchronizer 25 is turned on in this final speed increasing stage. In the case where an automatic speed matching (which is performed via the speed changer in the governor) is started while comparing the speed with the frequency of the power line, the response speed need be sufficiently suppressed in such a manner as not to be countered to the substance of the above-described meta-static shift.

Figure 15:
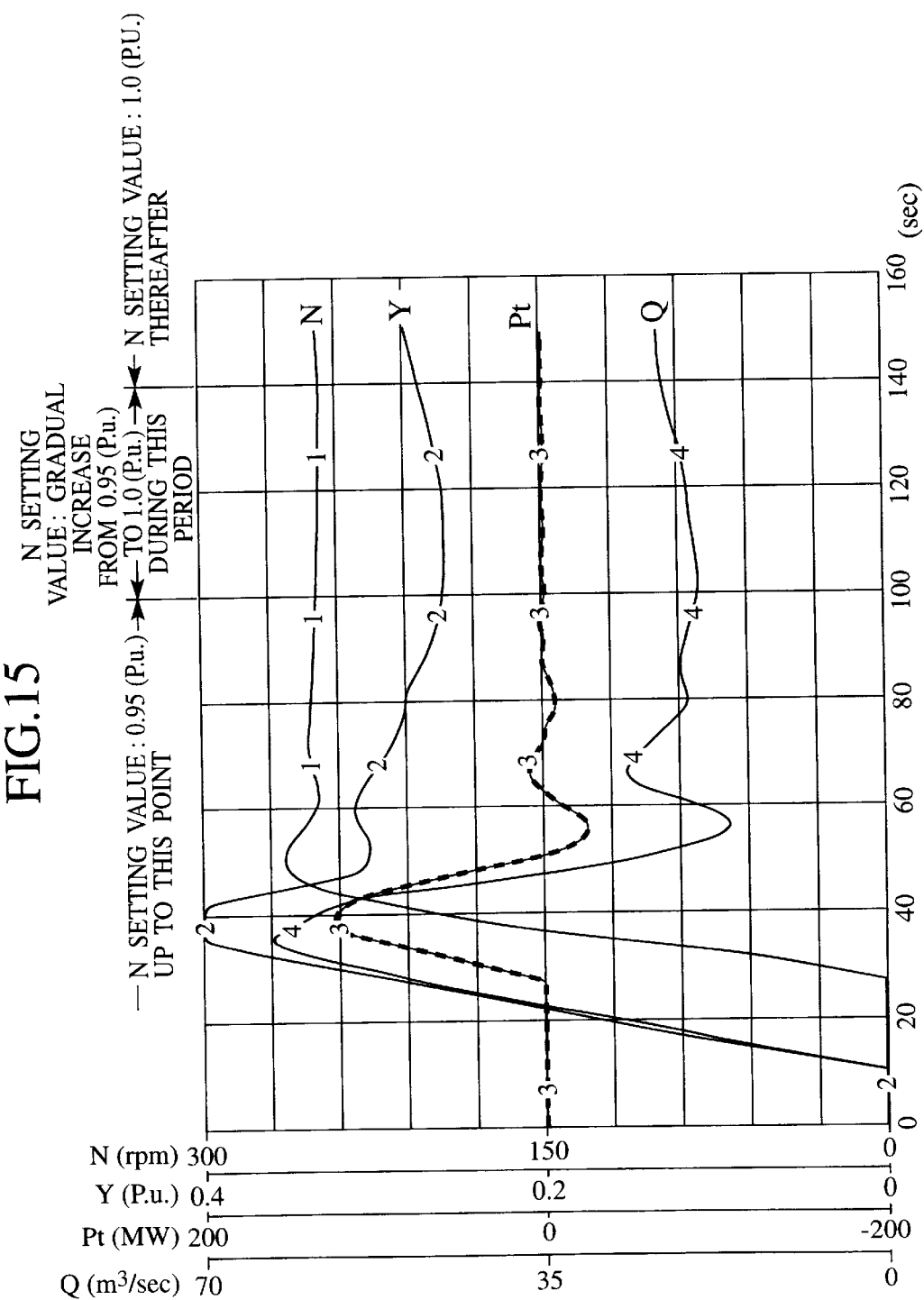
FIG. 15 is a diagram illustrating the behavior on starting of the pump turbine according to the present invention (in the case of the low head)
Figure 16:
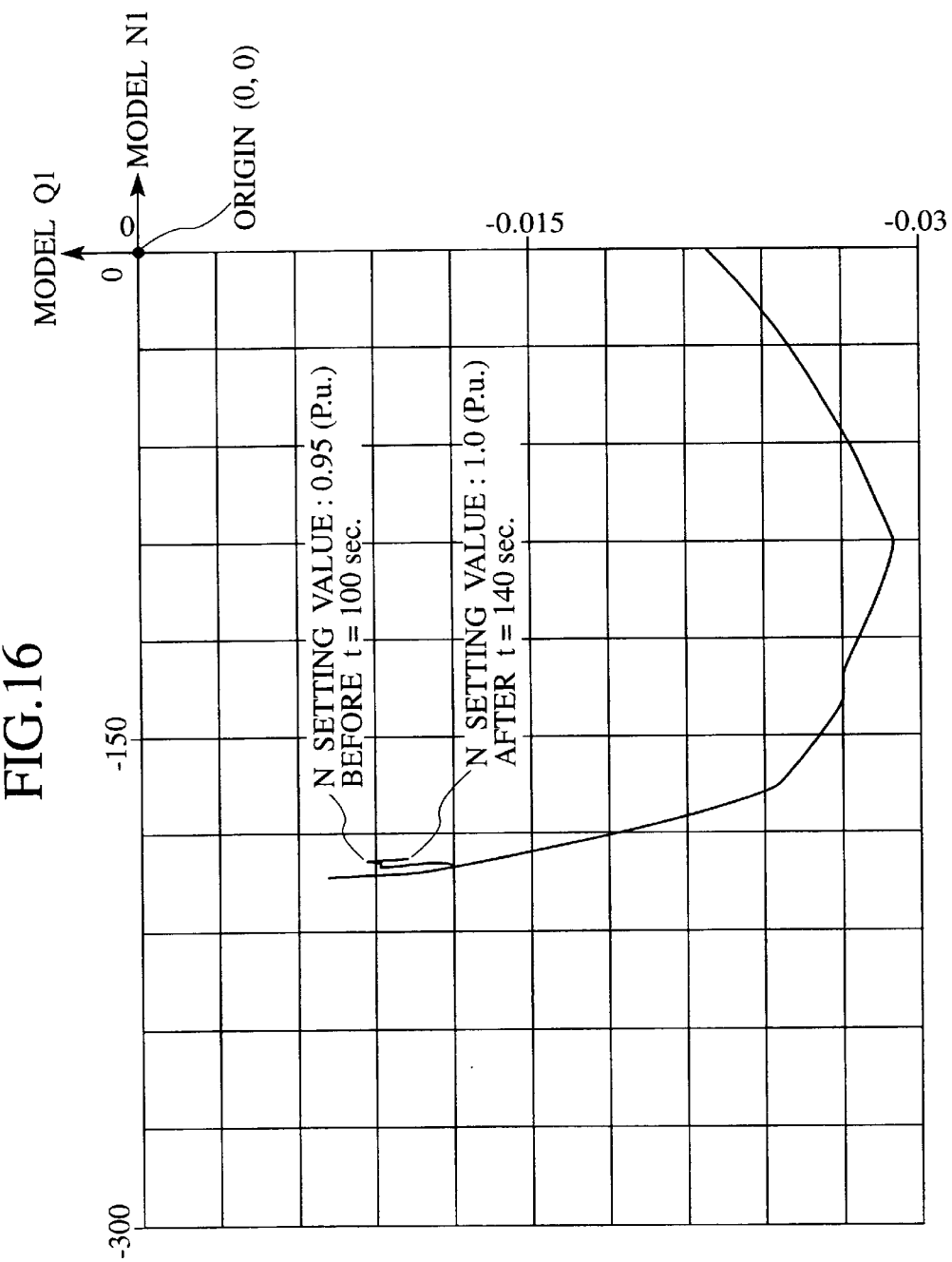
FIG. 16 is a diagram illustrating the trajectory of an operating point on a model turbine conversion plane on starting of the pump turbine illustrated in FIG. 15.
Figure 17:
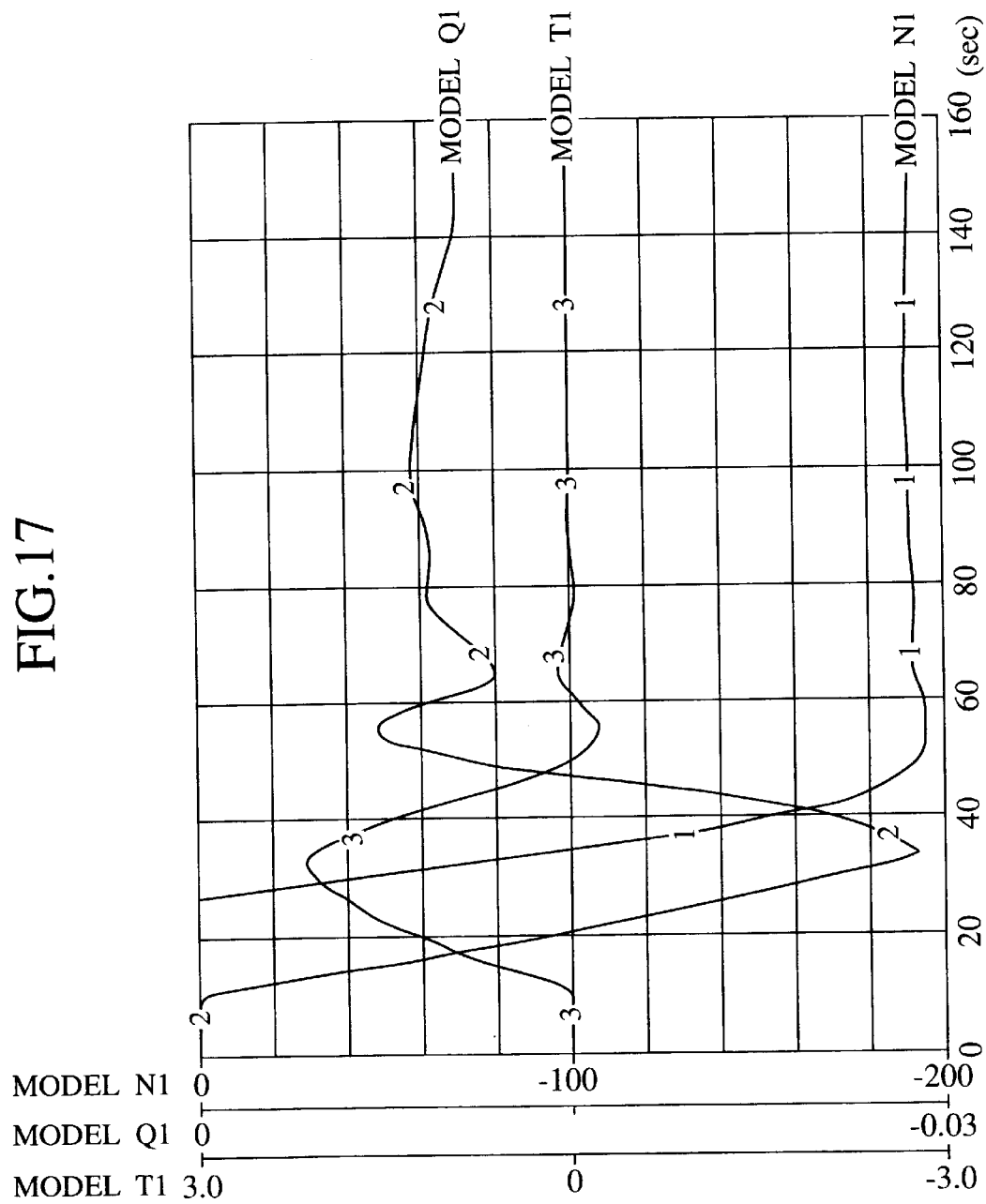
FIG. 17 is a graph illustrating a response of each of model turbine conversion variables on starting of the pump turbine illustrated in FIG. 15.

FIGS. 15 to 17 are diagrams illustrating simulation analysis examples on starting of the pump turbine in the above-described embodiment according to the present invention, and they correspond to the techniques illustrated in FIGS. 9 to 11 for the prior art, respectively. In these cases, the target value of the speed is set to 0.95 (p.u.) up to the timing of 100 sec., so that a transient response is temporarily stabilized. Thereafter, in 40 sec. after the timing of 100 sec., the target value of the speed is increased from 0.95 (p.u.) up to 1.0 (p.u.). Here, when the speed reaches 0.94 (p.u.) or more, the gains Kp and Ki of the governor are designed to automatically switch from 1.07 to 0.503 and from 0.0743 to 0.0372, respectively. As is clear from FIG. 15, the transient response after the starting can be completely settled till the timing of 100 sec., and thus, N can be meta-statically increased after the timing of 100 sec., as intended. Incidentally, although the setting value of the load limit also can be naturally decreased to 0.4 (p.u.) or less since the target speed on starting is decreased from 1.0 (p.u.) down to 0.95 (p.u.) in the example illustrated in FIG. 15, it remains set to 0.4 (p.u.) in order to be even ready to induce the same transient phenomenon on starting as that illustrated in FIG. 9.

Figure 4:
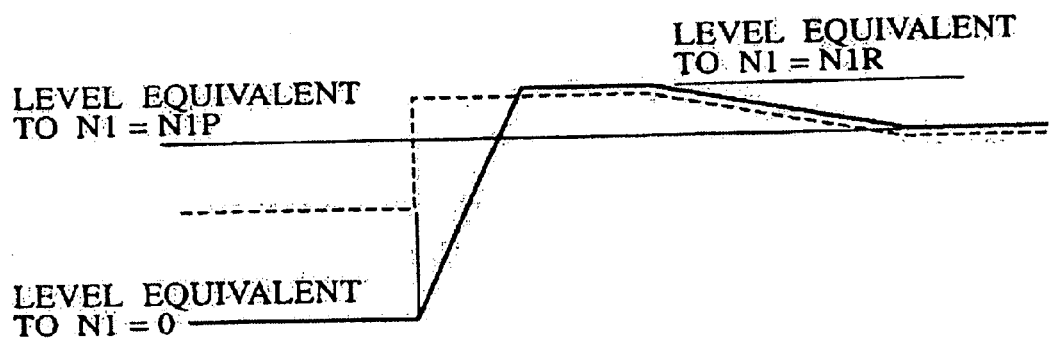
FIG. 4 is a diagram illustrating an operating example 2 of the speed changer on starting of the pump turbine according to the present invention.
Figure 13:
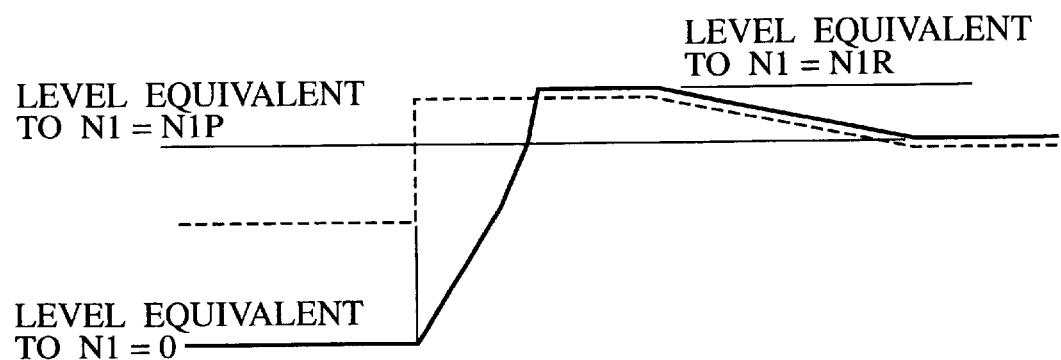
FIG. 13 is a diagram illustrating an operating example 3 of the speed changer on starting of the pump turbine according to the present invention.

FIG. 7 is a graph illustrating another preferred embodiment according to the present invention. In the present embodiment, the speed changer is adjusted as illustrated in FIG. 4, where an operating point N1 is raised from zero at a point ② right up to N1R at a point ③B beyond N1P equivalent to the rated speed. At a point ③B, the operating point is temporarily held until N is sufficiently stabilized and a water hammer is satisfactorily settled. When the operating point is shifted from ② to ③B, in particular, in a latter half, the stabilization at the point ③B can be speeded up by devising a decrease in discharge caused by the S-characteristics, that is, a decrease in discharge caused by the rising of a gradient $\partial Q1/\partial N1$ in such a manner as to cancel it by an increase in discharge caused by a wicket gate opening operation, that is, an increase in discharge caused by $(\partial Q1/\partial Y)\Delta Y$. FIG. 13 illustrates one example of an idea of controlling the speed changer for the purpose of the above-described speedy stabilization. In a speed increasing process, when the speed approaches the rated speed, gains Kpa and Kia of the governor are automatically switched to Kpb and Kib, respectively, by means of contacts of a speed relay 19, thereby enhancing the stability of the speed government system.

Thereafter, the operating point is slowly shifted to a point ③ while substantially holding the stable state achieved at the point ③B in a meta-statically decreasing operation by the speed changer as illustrated in the latter half of FIG. 4. In this case, since the speed is synchronized with the slow decrease, a synchronizer is turned on in the latter half of the shift from the point ③B to the point ③.

It is to be understood that the present invention is not restricted to the particular embodiments given above, and that various modifications and alterations can be added thereto without departing from the scope of the invention.

What is claimed is:

1. A pump turbine which is operated in a pumping mode or a generating mode by switching the rotating direction of a runner, comprising:

discharge adjuster for adjusting the discharge of water passing through the runner; and a speed governor for controlling the discharge adjuster so as to govern a speed;

wherein, when the speed is increased up to a rated speed on starting, the speed governor is controlled such that a speed change gradient after the speed reaches a first predetermined speed lower than the rated speed becomes smaller than a speed upward gradient before the speed reaches the first predetermined speed.

2. A pump turbine according to claim 1, wherein the speed change gradient is temporarily descended or is held to substantially zero in the stage in which the speed reaches the first predetermined speed, and thereafter, an increase in the speed is resumed.

3. A pump turbine according to claim 2, wherein the speed change gradient is sufficiently descended to such an extent as to prevent any recurrence of a water hammer inside of a penstock or a draft tube of the pump turbine which is temporarily damped when the speed is held at the first predetermined speed in the process in which the increase in the speed is resumed from the first predetermined speed.

4. A pump turbine according to claim 1, further comprising comparing means for comparing a head with a sixth predetermined head, so as to switch the speed charge gradient before and after the first predetermined speed in the case where the head is smaller than the sixth head.

5. A pump turbine which is provided with a runner and discharge adjuster for adjusting the discharge of water passing through the runner and can be operated in a pumping mode or a generating mode by switching the rotating direction of the runner, comprising:

comparator for comparing a head with a second predetermined head;

speed sensor for sensing the speed of the runner; and a speed governor for controlling the discharge adjuster in such a manner as to allow the speed to converge on a given command value based on the sensed speed;

wherein the response speed of the speed governor is decreased at least in a synchronizing stage in which the speed is led to the rated speed in comparison with the case where the head is larger than the second head in the case where the head is smaller than the second head based on the comparison result by the comparator in the process in which the speed is increased up to a rated speed on starting.

6. A pump turbine which is provided with a runner and discharge adjuster for adjusting the discharge of water passing through the runner and can be operated in a pumping mode or a generating mode by switching the rotating direction of the runner, comprising:

comparator for comparing a head with a third predetermined head; and a speed governor for controlling the discharge adjuster so as to govern a speed;

wherein the speed increase gradient is designed to become smaller at least in a synchronizing stage in which the speed is led to the rated speed in comparison with the case where the head is larger than the third predetermined head in the case where the head is smaller than the third predetermined head based on the comparison result when the speed is increased up to a rated speed on starting.

7. A pump turbine which is operated in a pumping mode or a generating mode by switching the rotating direction of a runner, comprising:

discharge adjuster for adjusting the discharge of water passing through the runner; and a speed governor for controlling the discharge adjuster so as to govern a speed;

wherein the speed governor is controlled such that the speed is temporarily led to a fourth predetermined speed higher than the rated speed, and thereafter, to the rated speed, and thus, a speed decrease gradient after the speed reaches the fourth predetermined speed becomes smaller than a speed increase gradient until the speed reaches the fourth predetermined speed in order to bring the speed to a rated speed on starting.

8. A pump turbine according to claim 7, wherein the speed change gradient is temporarily descended or is held to substantially zero in the stage in which the speed reaches the fourth predetermined speed, and thereafter, an inducement of the speed is started to the rated speed while the speed is decreased.

9. A pump turbine according to claim 7, wherein the speed decrease gradient is sufficiently descended to such an extent as to prevent any recurrence of a water hammer inside of a penstock or a draft tube of the pump turbine which is temporarily damped when the speed is held at the fourth predetermined speed in the process in which the speed is decreased from the fourth predetermined speed.

10. A pump turbine which is provided with a runner and discharge adjuster for adjusting the discharge of water passing through the runner and can be operated in a pumping mode or a generating mode by switching the rotating direction of the runner, comprising:

speed sensor for sensing the speed of the runner; and a speed governor for controlling the discharge controlling means in such a manner as to allow the speed to converge on a given command value based on the sensed speed;

wherein the response speed of the speed governor is decreased after the speed reaches a fifth predetermined speed different from a rated speed more than before the speed reaches the fifth predetermined speed in the process in which the speed is increased up to the rated speed on starting.

11. A pump turbine according to claim 10, further comprising comparing means for comparing a head with a second predetermined head so as to switch the response speed of the speed governor at the fifth predetermined speed only in the case where the head is smaller than the second predetermined head.

12. A pump turbine according to claim 10, wherein a deviation between a target speed and a sensed speed is subjected to integral computation, followed by a control based on the integral result, and further, the response of the speed governor is switched by changing an integral constant under the integral control.

13. A pump turbine according to claim 12, wherein the deviation between the target speed and the sensed speed is subjected also to proportional computation, followed by a control also based on the proportional result, so as to control the speed in such a manner as to allow it to approach the target speed, and further, the response of the speed governor is switched by changing also a constant of the proportional computation control.

14. A pump turbine according to claim 13, wherein the discharge adjuster is controlled such that the speed reaches the rated speed substantially along a run-away speed line after the speed reaches a predetermined temporatry target speed.

15. A pump turbine controlling method comprising the steps of:

switching the rotating direction of a runner so as to enable a pump turbine to be operated in a pumping mode or a generating mode;

sensing the speed of the runner on starting of power generation;

controlling the discharge adjusting means in such a manner as to allow the speed to temporarily approach a target speed, which is set to a value different from a rated speed, based on the sensed speed; and controlling the response speed of the discharge adjusting means to a level lower than that before the speed reaches the target speed in the stage in which the speed is led to the rated speed after the speed reaches the target speed.

16. A pump turbine which is operated in a pumping mode or a generating mode by switching the rotating direction of a runner, comprising:

a shaft for transmitting torque of the runner to a generating motor;

discharge adjuster for adjusting the discharge of water passing through the runner; and a governor for sensing the speed of the runner in the generating mode, so as to control the discharge adjuster in such a manner that the speed of the runner becomes a command value;

wherein the transfer function of the governor is switched in a direction in which the stability of the governor can be more improved after the speed is increased up to about a rated speed than before the speed is increased up to about the rated speed in the case where the pump turbine is started at least at a head smaller than a predetermined head in the generating mode.

17. A pump turbine according to claim 16, wherein the transfer function of a computation unit in the governor is designed to be switched before and after the speed is increased up to about the rated speed in the case where the pump turbine is started at least at a head smaller than a predetermined head in the generating mode, and the stability of the governor can be improved after the speed is increased up to about the rated speed more than before the speed is increased up to about the rated speed.

18. A pump turbine according to claim 17, wherein the computation unit in the governor has three elements, i.e., a proportional element, an integral element and a derivative element, and a setting value of the integral element is switched before and after the speed is increased up to about the rated speed.

19. A pump turbine which is operated in a pumping mode or a generating mode by switching the rotating direction of a runner, comprising:

a shaft for transmitting torque of the runner to a generating motor;

discharge adjuster for adjusting the discharge of water passing through the runner; and a governor for sensing the speed of the runner in the generating mode, so as to control the discharge adjuster in such a manner that the speed of the runner becomes a command value;

wherein, in the case where the pump turbine is started at least at a head smaller than a predetermined head in the generating mode, the speed command value is temporarily set to a first command value lower than a rated speed, and then, the speed is temporarily maintained around the first command value, and thereafter, the speed command value is gradually increased such that the speed is allowed to reach a synchronous speed equivalent to the frequency of a power line.

20. A pump turbine according to claim 19, wherein the first command value is set to about a speed immediately before a discharge downward gradient $|\partial Q/\partial N|$ or $|\partial Q1/\partial N1|$ or an equivalent state discharge according to an increase in speed abruptly rises up.

21. A pump turbine which is operated in a pumping mode or a generating mode by switching the rotating direction of a runner, comprising:
   a shaft for transmitting the torque of the runner to a generating motor;
   discharge adjuster for adjusting the discharge of water passing through the runner; and
   a governor for sensing the speed of the runner in the generating mode, so as to control the discharge adjuster in such a manner that the speed of the runner becomes a command value;
   wherein the command value is temporarily set to a first command value lower than a rated speed, followed by temporarily maintaining the speed, and thereafter, the command value is gradually increased such that the speed is synchronized with a speed equivalent to the frequency of a power line, so that the transfer function of the governor is switched in a direction in which the stability of the governor can be more improved when the speed is increased up to about the rated speed in the case where the pump turbine is started at least at a head smaller than a predetermined head in the generating mode.

22. A pump turbine which is operated in a pumping mode or a generating mode by switching the rotating direction of a runner, comprising:
   a shaft for transmitting torque of the runner to a generating motor;
   discharge adjuster for adjusting the discharge of water passing through the runner; and
   a governor for sensing the speed of the runner in the generating mode, so as to control the discharge adjuster in such a manner that the sensed speed becomes a speed command value;
   wherein the transfer function of the governor is switched in a direction in which the stability of the governor can be improved when the speed reaches about a synchronous speed or higher in the case where the pump turbine is started at least at a head smaller than a second predetermined head in the generating mode, and further, the command value being temporarily set to a fourth command value higher than a rated speed, followed by temporarily maintaining the speed, and thereafter, the command value is gradually decreased, so that the speed is gradually led to the synchronous speed equivalent to the frequency of a power line in the case where the pump turbine is started at least at a head smaller than a third predetermined head.

23. A pump turbine according to claim 22, wherein the command value is temporarily set to the fourth command value, the speed is temporarily stabilized while waiting for settlement of a transient phenomenon such as a water hammer, and thereafter, the speed command value is gradually decreased at such a rate that no harmful water hammer occurs, so that the speed is led to a synchronous speed equivalent to the frequency of a power line.

24. A pump turbine which is operated in a pumping mode or a generating mode by switching the rotating direction of a runner, comprising:
   a shaft for transmitting the torque of the runner to a generating motor;
   discharge adjuster for adjusting the discharge of water passing through the runner; and
   a governor for sensing the speed of the runner in the generating mode, so as to control the discharge adjusting means in such a manner that the speed of the runner becomes a command value;
   wherein the command value is temporarily set to a first command value lower than a rated speed, followed by temporarily maintaining the speed, thus temporarily stabilizing the speed and waiting for settlement of a transient phenomenon such as a water hammer, and thereafter, the speed command value is gradually increased at such a rate that no harmful water hammer occurs, thus allowing the speed to reach a synchronous speed equivalent to the frequency of a power line in the case where the pump turbine is started at least at a head smaller than a predetermined head in the generating mode.

* * * * *